(12) United States Patent
Duflot et al.

(10) Patent No.: US 7,863,926 B2
(45) Date of Patent: Jan. 4, 2011

(54) DEVICE FORMING A LOGIC GATE FOR MINIMIZING THE DIFFERENCES IN ELECTRICAL OR ELECTRO-MAGNETIC BEHAVIOR IN AN INTEGRATED CIRCUIT MANIPULATING A SECRET

(75) Inventors: Loïc Duflot, Noisy-le-Grand (FR); Philippe Le Moigne, Clamart (FR); Fabien Germain, Levallois (FR)

(73) Assignee: Etat Francais, représenté par le Secretariat General de la Defense Nationale (FR)

( * ) Notice: Subject to any disclaimer, the term of this patent is extended or adjusted under 35 U.S.C. 154(b) by 94 days.

(21) Appl. No.: 11/919,773

(22) PCT Filed: May 4, 2006

(86) PCT No.: PCT/EP2006/062037

§ 371 (c)(1),
(2), (4) Date: Dec. 19, 2008

(87) PCT Pub. No.: WO2006/117391

PCT Pub. Date: Nov. 9, 2006

(65) Prior Publication Data

US 2009/0302882 A1    Dec. 10, 2009

(30) Foreign Application Priority Data

May 4, 2005    (FR)    .................................. 05 04569

(51) Int. Cl.
*H03K 19/00* (2006.01)

(52) U.S. Cl. ............................. 326/8; 326/113; 380/255
(58) Field of Classification Search ...................... None
See application file for complete search history.

(56) References Cited

U.S. PATENT DOCUMENTS 5,901,083 A * 5/1999 Atsumi et al. .......... 365/185.11
2004/0030858 A1    2/2004 Lines et al.

FOREIGN PATENT DOCUMENTS

WO    WO-2005029704    3/2005

OTHER PUBLICATIONS

Tiri K et al: "A Dynamic And Differential CMOS Logic With Signal Independent Power Consumption To Withstand Differential Power Analysis On Smart Cards", Proceedings of the European Solid State Circuits Conference, 2002, pp. 403-406, XP-001223944.
International Search Report, PCT/EP2006/062037.

* cited by examiner

*Primary Examiner*—Rexford N Barnie
*Assistant Examiner*—Jany Tran
(74) *Attorney, Agent, or Firm*—Lerner, David, Littenberg, Krumholz & Mentlik, LLP (57) ABSTRACT

An electrical device having a logic gate whose consumption is independent from its input data and its logic state. To this end, the device uses logic means forming switches. The interest in having a device of this type is, for example, to protect chip cards and other cryptosystems from attacks via auxiliary channels, such as collision attacks by and attacks by differential analysis of current, power or consumption. This protection is provided by the hardware. The device is for integration in all devices requiring such a protection.

17 Claims, 7 Drawing Sheets

FIG_7

FIG. 9

# DEVICE FORMING A LOGIC GATE FOR MINIMIZING THE DIFFERENCES IN ELECTRICAL OR ELECTRO-MAGNETIC BEHAVIOR IN AN INTEGRATED CIRCUIT MANIPULATING A SECRET

CROSS REFERENCE TO RELATED APPLICATIONS

The present application is a national phase entry under 35 U.S.C. §371 of International Application No. PCT/EP2006/062037, filed May 4, 2006, published in French, which claims benefit of French Patent Application No. 0504569, filed May 4, 2005. The disclosures of all of said applications are incorporated by reference herein.

This invention relates to the field of electrical logic circuits.

It relates more particularly to the fight against information leaks due to the differences in electrical or electromagnetic behaviour of a device of the logic circuit type.

It has advantageously, but not restrictively, an application in devices handling secrets of the logic circuit type, or even in cryptographic devices of the logic circuit type.

One general objective of the invention is to propose a device forming a logic gate whose consumption, radiation or all other external physical grandeurs that may be measured non intrusively, are independent of the operation carried out; which is to say they are independent of the input data of the gate, the past or future inputs of the gate, of its past, present or future logic state and the corresponding logic results.

It is known that classic electronic circuits generally have a consumption which differs according to the logic states and the transitions of their input data. In particular, a logic inverter will consume differently if its only input passes from the logic state 0 to the logic state 1, or if it passes from the logic state 1 to the logic state 0. It will consume differently again if the logic state remains unchanged, which is to say if it passes from the logic state 0 (respectively 1) to the logic state 0 (respectively 1). The same is true for all other logic gates. Hereunder, the term "transition" will be used for the changes in logic state or remaining in the same logic state.

For each possible transition of the input data, every gate therefore has an electrical or electromagnetic behaviour that is a priori different. The term characteristic "signature" of a transition will be used for the electrical or electromagnetic behaviour caused by a transition of the input of the gate considered. For a given logic gate, each possible transition of the input variables thus has a different signature a priori. This observation remains valid whether the technology used is of the synchronous or asynchronous type. It is pointed out that in synchronous mode, all of the elements share a discreet common notion of time, like a global clock signal. In asynchronous mode, on the contrary, there is no discreet notion of time between the elements. It is replaced by a mechanism called "handshake" operating a local synchronisation, and thus providing the communication and the sequencing of the operations.

The attacks by differential analysis of current, power or consumption, use these considerations to identify a secret item of information used by the classic electrical circuits, for example during a cryptographic calculation by a cryptosystem or during a verification of the knowledge of a secret element.

Several logic circuit devices are known presented as allowing the differences between signatures to be reduced. However, for such devices, the reduction is largely insufficient faced with the numerous applications where security is paramount. In particular, the purely hardware devices prior to the present invention do not manage to resolve efficiently the problem of the impedance adaptation required for the general objective.

When a signature reduction is necessary, the cryptographic circuit designers tend to use masking techniques using a hazard to de-correlate the input values of the calculation module, from the calculation that is made. These solutions are extremely penalising in terms of performance as they require a large number of hazard bits to be obtained in a very short space of time. The result is a drop in performances of the device.

Another objective of the invention is to propose a solution capable of being achieved that does not require the use of hazards permitting an effective fight against attacks by differential analysis of current, power or consumption, by providing a level of security that is superior to other known devices with logic circuit(s).

Another objective of the invention is to take into account and neutralise the signature corresponding to the logic passage of the inputs, from one logic state to this same logic state (for example the case of an inverter whose input passes from the logic state 0 to the same logic state 0). In fact, the fact that it remains in the same logic state creates in all of the known devices with logic circuit(s) a signature that is different from that caused by any other transition. This may be used in certain attacks. The purpose of the invention therefore, by balancing in the same way the signatures due to a change or not of the logic state, is to propose an effective countermeasure against this type of attack.

The above-mentioned objectives are achieved in the scope of this invention, thanks to a device which forms an electrical circuit, characterised by the fact that it comprises logic means forming switches, included in a logic function and adapted to de-correlate the input data of said logic function, of all external grandeurs that may be measured.

Within the scope of this invention, the term switch is used to describe any device located on a data logic path which permits, in certain states, to de-correlate the electrical characteristics of certain inputs from those of certain outputs of the device, and in certain states to transmit certain logic values of certain inputs on certain outputs. The CMOS switches or the multiplexers are examples provided non restrictively of devices which comply with this definition.

The invention takes advantage of certain logic structures and protocol considerations. It leads to the creation of elementary logic gates, for which the difference in signature between any two transitions of the inputs of the logic gate is largely reduced and most difficult to measure.

Such gates may be assembled to form a functional logic circuit.

In other advantageous but non restrictive characteristics of the invention:
  the gate features semi-conductor logic means.
  the gate carries out a chosen logic function in the group comprising a NAND logic function between two input bits, a NOR logic function, a XOR logic function, an OR logic function and an AND logic function,
  the gate carries out the NAND logic operation between two logic bits transported by channels carrying the value of each of these bits.
  the means forming switches are used to create the impedance adaptation of nodes inside the gate.
  these switches are semi-conductor logic means.
  the device comprises a logic gate carrying out a logic function and that incorporates the logic means forming switches, and the logic gate comprises an input interface on which it receives the quantities on which said device calculates said logic function, an interface that receives a power supply, a transitory state electronic circuit connected to the input interface calculating said logic function on said quantities, so that the consumption of said circuit during said calculation on said quantities may not be correlated to said quantities, and an output interface permitting the result of said logic function to be communicated to the environment of said device.

all the components of the circuit participate at least at certain instants, depending on the value of the input data, in the calculation of the logic function.

the device features charge or discharge means which may respectively be activated by a node inside the gate.

the device is directly inserted between two asynchronous logic gates generating their own acceptance signal, which provides the protocol.

it is adapted so that there are no nodes remaining whose value depends on the previous calculations during the passage from the non-valid state of the protocol.

it transports electronic states called '0', '1', '0' weak, '1' weak.

it contains memory cells, it forms all or part of a device carrying out a cryptographic operation and that uses a secret element, such as for example a cryptographic operation comprising a symmetrical cryptographic operation per block, a cryptographic operation comprising an asymmetrical cryptographic operation.

said cryptographic operation comprises a multiplier.

it includes means forming switches designed to reduce the global consumption of the gate, for example by reducing the conduction time of the transistors connected between the power supply and the earth.

said means forming switches designed to reduce the consumption of the gate limit the dynamic leak currents.

it features means uniquely designed to increase the propagation time of certain intermediate variables so as to reduce the absolute consumption of the gate by limiting the dynamic leak currents.

the means forming switches may each be formed by a single MOS transistor, or each by several MOS transistors, for example a NMOS transistor and a PMOS transistor.

said means forming switches may be made for example in conduction logic, in the form of passage transistor(s) or other equivalent means it is based on a symmetrical architecture in which at least certain of the components have a symmetry with an opposed transition change.

The device of this invention advantageously uses a protocol comprising an "invalid data" state. More precisely, in such a protocol, the coding of the data permits states to be distinguished where that data is present, and therefore where it has a certain logic value, and a state where the data is on hold, and is therefore not associated to any logic value. Such a state is called invalid. Especially in one preferred embodiment of the invention, the device uses a protocol called "4 phase asynchronous double rail" known in the state of the art for over fifty years. Advantageously again in such an embodiment, the gate is auto-synchronised, such that it does not require any control signal other than those transported by the classic asynchronous protocol (data and acceptance).

In one second possible embodiment of the invention, the device uses a synchronous protocol using several means forming controls generated externally from the device.

The device of this invention features advantageously, but not restrictively, semi-conductor means permitting all memory effects in the gate to be deleted as soon as there is a passage by the invalid state provided by the protocol. In particular in one preferred embodiment, as soon as the gate passes to the invalid state, the state of all of the nodes of said gate is refreshed to a predetermined known state. This passage of each node to a known state guarantees that no memory of the past state, and therefore of the logic value since a transition has been made, remains in the circuit.

Advantageously, but not restrictively, certain means forming switches are used to allow nodes considered to be reset by connection to the earth via said means forming switches.

Advantageously, but not restrictively, again-certain means forming switches are used for connection to one of the nodes considered by connexion to the power supply via said means forming switches.

The device features advantageously, but not restrictively, semi-conductor means permitting the logic function to be created, for which the gate has been designed whilst preserving a correspondence between certain nodes of the circuit, so that for each group of nodes in correspondence, the Hamming weight is constant regardless of the valid inputs of the gate, as is the case in the majority of the devices of the state of the art for over fifty years using double rail asynchronous technology, and such that, even with the connection of additional capacities to the gate, identical on the two rails, the charge seen by each of the nodes of each assembly is in practice identical.

In one preferred embodiment, the device features 4 gates called "meeting gates" (Muller C elements) permitting a synchronisation of the data, wherein each of these gates is connected to an equal number of transistor grills. Nevertheless, it must be underlined that the end purpose of the 4 Muller C elements, and the double rail protocol is solely for protocol. The objective of the invention is achieved using the switches of the invention which are associated downstream to these elements.

The invention is advantageously, but not restrictively, used in structures with cryptographic circuits. Said structures with cryptographic circuits advantageously contain one or more different logic gates using the invention.

The device is advantageously, but not restrictively, integrated into an integrated circuit, such as an ASIC or an FPGA.

In an ASIC, these gates may advantageously be used together with gates with a standard library or a dedicated library.

Other characteristics, objectives and advantages of the invention will become clearer in the following description, which is purely illustrative and non restrictive, and which is to be read in relation to the appended drawings in which.

Figure 1:
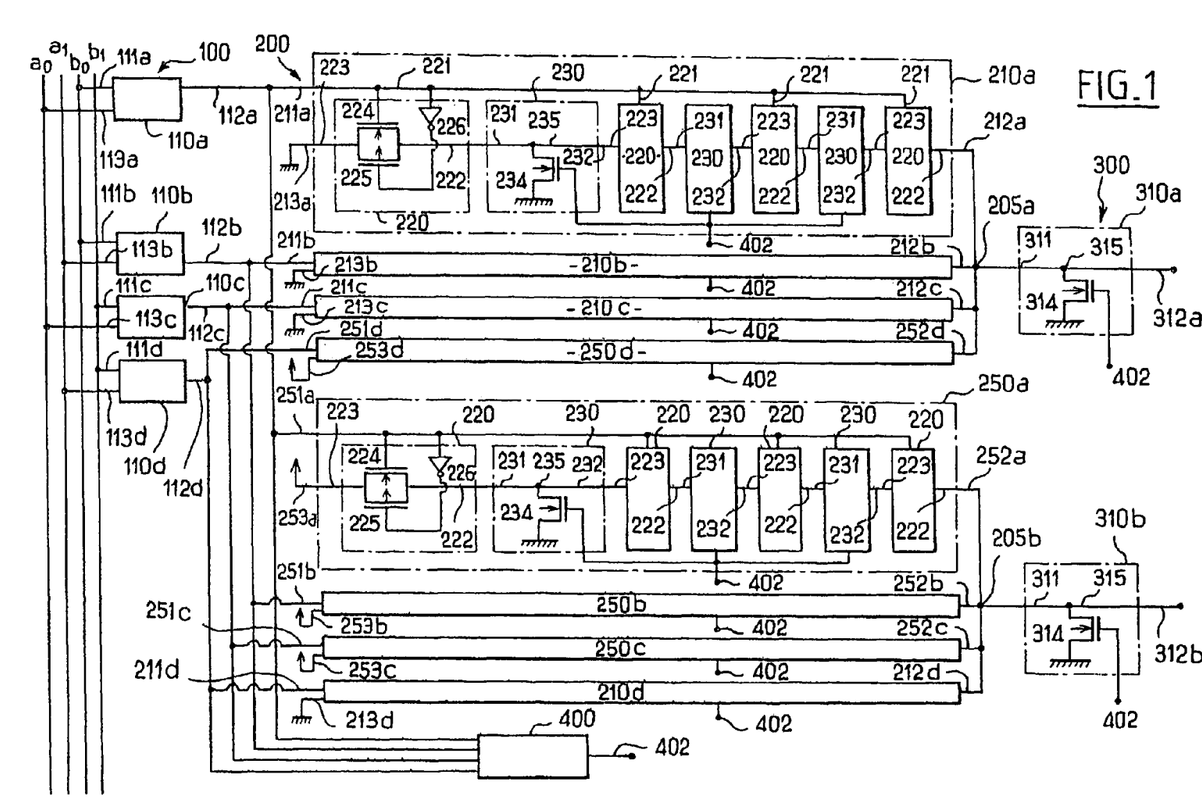
FIG. 1 is a block diagram of a logic circuit of one possible embodiment of the invention creating an AND logic function in asynchronous mode.

FIG. 1 illustrates an example of one possible embodiment of a device of the invention creating an AND logic function used as part of a classic 4-phase double rail asynchronous protocol that will be mentioned again below. The gate performs a binary AND operation between two logic inputs a and b. Shown below is the truth table of such an AND gate:

| a | b | AND(a, b) |
|---|---|---|
| false | false | false |
| false | true | false |
| true | false | false |
| true | true | true |

The device illustrated in FIG. 1 comprises an input stage 100 composed of meeting elements 110, an intermediate stage 200 composed of chains 210, 250 formed by the alternate association of means forming switches 220 and charge/discharge devices 230 also featuring devices forming switches, an output stage 300 and a module forming NOR gate 400 designed to generate a control command for the means integrated in the previously mentioned stages 200 and 300.

The input data items a, b are respectively coded on two bits using the 4-phase double rail asynchronous protocol. Thus a 0 logic is coded by the pair '01' and a 1 logic is coded by the pair '10'. The protocol further comprises a state called invalid coded by the pair '00'. The state '11' is forbidden and is ignored by the protocol. The output data uses the same coding.

The protocol is as follows: if the two inputs are in the invalid state, transmit the invalid state. If only one of the inputs is valid: wait until the second input is valid. As soon as the two inputs are valid, calculate the AND value between the two inputs. The return to the invalid state is necessary before any new calculations. Such a reset of the input data is provided by the environment of the gate, which uses the asynchronous acceptance signal (generated either using an OR logic between the signals available on the outputs 312a, 312b, or by the environment of the gate).

The truth table of the AND gate then becomes:

| a | b | a1 | a0 | b1 | b0 | AND (a, b) | AND (a, b)1 | AND (a, b)0 |
|---|---|---|---|---|---|---|---|---|
| invalid | invalid | 0 | 0 | 0 | 0 | invalid | 0 | 0 |
| false | false | 0 | 1 | 0 | 1 | false | 0 | 1 |
| true | false | 1 | 0 | 0 | 1 | false | 0 | 1 |
| false | true | 0 | 1 | 1 | 0 | false | 0 | 1 |
| true | true | 1 | 0 | 1 | 0 | true | 1 | 0 |

The other situations correspond either to a situation of waiting for a meeting from the input data (one data item is valid and the other is not) or to an illicit state (at least one of the inputs is at the '11' state).

The 110 type circuits of the input stage 100 are designed to synchronise the input data a, b (indispensable in asynchronous protocol). Therefore four circuits 110a, 110b, 110c and 110d are provided of the same structure, with two inputs 111a, 113a, 111b, 113b, 111c, 113c and 111d, 113d and one output 112a, 112b, 112c and 112d. The inputs 111, 113 of the circuits 110 are connected to pairs respectively different from the inputs a1, a0, b1 and b0. The outputs 112 of the circuits 110 change state when two states of the same type, valid or invalid, are applied to the associated inputs 111 and 113.

Figure 2:
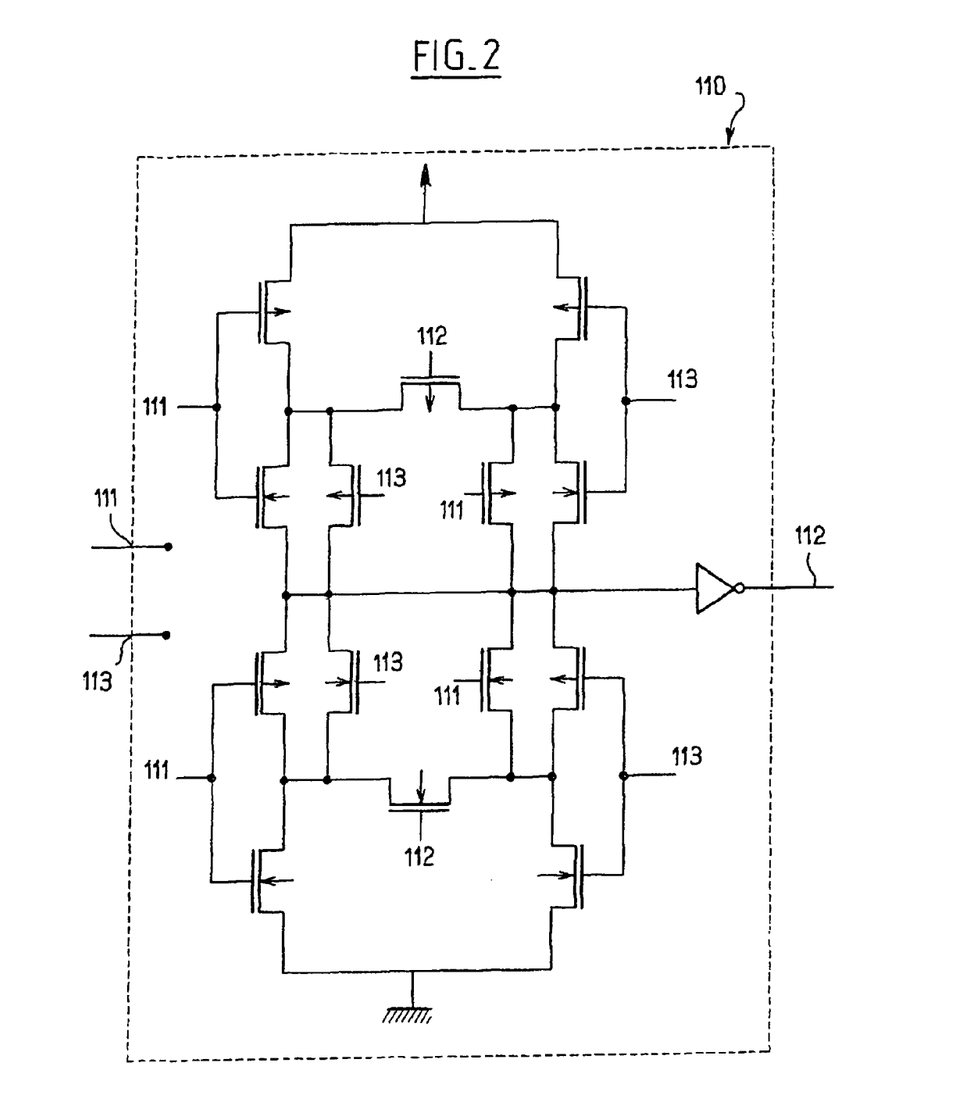
FIGS. 2, 3 and 4 detail the structure of possible sub-assemblies of the embodiment presented in FIG. 1.

FIG. 2 appended shows a non restrictive example of one embodiment of such a circuit 110. The embodiment thus represented is known to those skilled in the art. Therefore it will not be described in detail below. Those skilled in the art will understand upon examining FIGS. 1 and 2 that only one of the outputs 112 of the 4 circuits 110 is at 1 at any one time.

The outputs 112a, 112b, 112c and 112d of these stages 110 are connected to the corresponding inputs 211, 251 of the chains of switches 210, 250, as well as to the input of the module 400.

The chains 210, 250 are formed by a series of switches 220 and charge/discharge devices 230, alternated. They are piloted by the timing signal issued from the output 402 of the module 400. The means controlling the circuits 210 are such that: if the input 211 251 is equal to '0' and the signal 402 is equal to '1', then all of the nodes inside the circuit 210, 250 are forced to 0. If the input 211, 251 is equal to '1' and the signal 402 is equal to '0', then all of the switches 220 are conductive and the value of the power supply 213, 253 (which is to say the earth for the circuits 210 and the value of the positive power supply for the circuits 250) is copied to the output 212, 252. If the input 211, 251 is equal to '0' and the signal 402 is equal to '0', then all of the means forming switches 220 are non conductive, the same as the charge/discharge means incorporating switches 230. The internal nodes are in the high impedance state, the same as the output 212, 252. The state in which the input 211, 251 is equal to '1' and the signal 402 is equal to '1' may only be achieved transitorily.

More precisely for X circuits 110, there are provided n sets of X circuits 210 and n sets of X circuits 250, wherein the inputs 211, 251 of one of the circuits 210 and one of the circuits 250 of each of the n sets is connected in parallel to the output 112 of a circuit 110. These n sets of X circuits 210, 250 are spread distributed into n groups each comprising X circuits, wherein each of the n groups comprises Y circuit(s) of type 210 or 250 and (X-Y) circuits of type 250 or 210. The outputs of the circuits 210 and 250 of each of the n groups are connected in common at a respective node 205a, 205b. In the embodiment of FIG. 1, there are consequently provided two groups of 4 circuits 210, 250. One of the groups comprises (X-1), which is to say 3, circuits of type 210 whose power supply 213 is connected to the earth and 1 circuit of type 250 whose power supply 253 is connected to the positive power supply, whereas the other group comprises (X-1), which is to say 3, circuits of type 250 whose son power supply 253 is connected to the positive power supply and 1 circuit of type 210 whose power supply 213 is connected to the earth.

In the non restrictive embodiment illustrated in FIG. 1 appended, the switch circuits 220 comprise two MOS transistors 224, 225 of opposite type p and n, whose grills are connected to an input 221 respectively directly and via an inverter 226. The drain-source paths of the transistors 224, 225 are connected, for their part, in parallel, between an input 223 and an output 222 of the circuit 220.

It is pointed out here that in the scope of this description, by drain-source path, it is meant a bi-directional path, which is to say both from the drain towards the source and from the source towards the drain.

The charge/discharge circuits 230 illustrated in FIG. 1 appended comprise a MOS transistor type n 234 whose grill is connected to the output 402 of the module 400, whereas its drain-source path is connected between the earth and a node 235 that itself is connected to the input 231 and the output 232 of the circuit 230.

All of the circuits 220 have their input 221 connected to the input 211 or 251. The first circuit 220 of each chain 210 or 250 has its input 223 connected to a power supply (respectively an earth for the type 210 circuit and a positive power supply for the type 250 circuits). Its output 222 is connected to the input 231 of a discharge circuit 230. The output 232 of this circuit 230 is itself connected to the input 223 of the following circuit 220 and so on, to the last circuit 220 of the chain whose output 222 is the output 212 or 252 of a chain 210 or 250.

In the representation shown in FIG. 1, each chain 210, 250 comprises 4 switches 220 and 3 discharge circuits 230 interpositioned. The invention is however not limited to this number nor to this structure of cells placed in series between the power supply terminal 213, 253 at the input and the output 212, 252. In particular, it may be envisaged to reduce or increase this number of cells 220/230 if the manufacturing technologies of the switches or the structure of the switches permits their impedance to be adapted with respect to the technologies that are currently available.

The output circuits 310a and 310b are formed by a means forming a switch with a discharge function whose command is the signal 402. They are preferably identical to the circuits 230. In fact in FIG. 1 appended, there are circuits 310 comprising a MOS transistor type n 314 whose grill is connected to the output 402 of the module 400, whereas its drain-source path is connected between the earth and a node 315 which is itself connected to the input 311 and the output 312 of the circuit 310.

The outputs 212a, 212b, 212c and 252d are connected to one another. This common output node 205a is connected to the input of the device 310a. Similarly, the outputs 252a, 252b, 252c and 212d are connected to one another. This common output node 205b is connected to the input of the device 310b.

The outputs 312a and 312b form the outputs of the assembly. The output 312a corresponds to the logic function AND (a,b)1, whereas the output 312b corresponds to the logic function AND(a,b)0.

Figure 3:
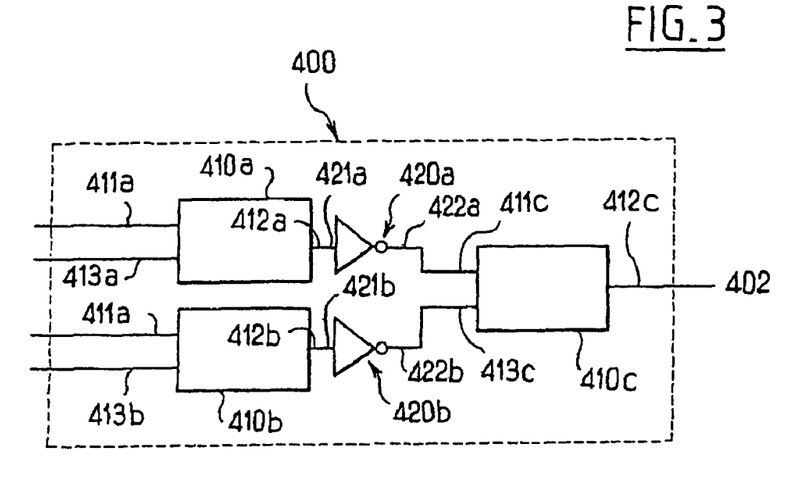
Figure 4:
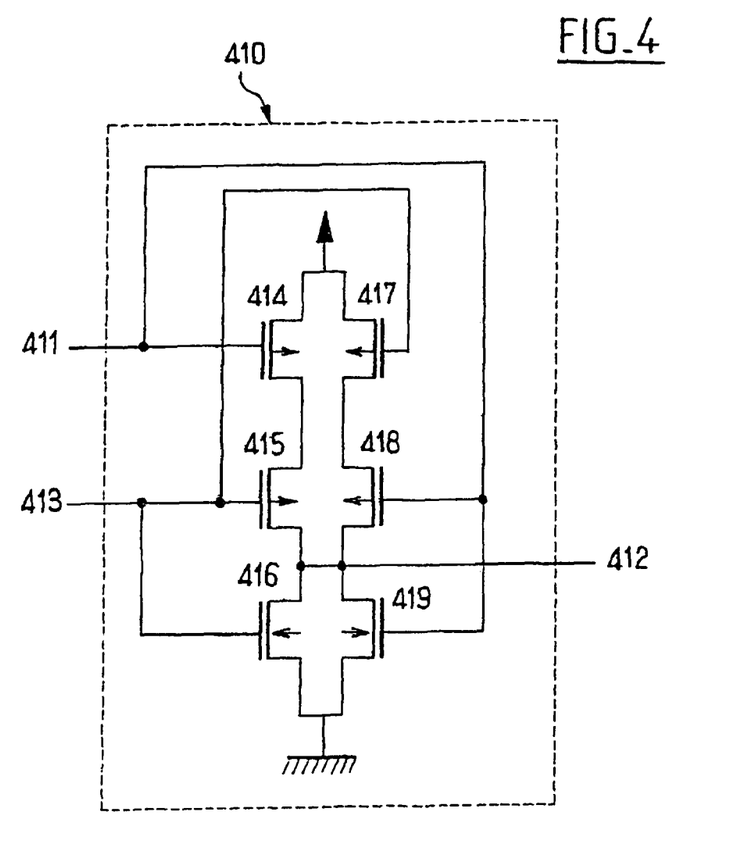

FIGS. 3 and 4 appended show one example of an embodiment of the module 400 designed to generate the control signal 402. In the embodiment illustrated in FIGS. 3 and 4, the module 400 is composed of three circuits 410a, 410b, 410c of identical constitution and of two inverters 420a, 420b. The inputs 411a, 413a; 411b, 413b of the two circuits 410a, 410b are connected to one respective pair of the outputs 112a, 112b, 112c and 112d of the input stage 100. Their output 412a and 412b respectively attack the input 421a, 421b of an inverter 420a, 420b. The outputs 422a, 422b of the latter are connected to the inputs 411c, 413c of the circuit 410c. Finally, the output 412c of the circuit 410c forms the output 402 of the module 400.

One specific embodiment of the circuits 410 is illustrated in FIG. 4. This figure shows a circuit comprising two first parallel branches of two MOS transistors 414(p), 415(p) on the one hand and 417(p), 418(p) on the other hand. The circuit further features two second parallel branches of a MOS transistor 416(n) on the one hand and 419 (n) on the other hand. The drain-source conduction paths of the transistors 414, 415, 416 on the one hand and 417, 418, 419 on the other hand, are connected in series between the positive power supply terminal and the earth.

From the positive power supply, the transistor grill 414 is connected to an input 411, whereas the grills of the next two transistors 415 and 416 are connected to the second input 413. Symmetrically, from the positive power supply, the grill of the transistor 417 is connected to the second input 413, whereas the grills of the next two transistors 418 and 419 are connected to the first input 411. The output 412 is taken from the node that is common to the drains and sources of the four transistors 415, 416 and 418, 419 positioned on the earth side.

Those skilled in the art will understand that the module 400 is designed to generate the sequencing signals 402 from the double rail protocol signals. This module is therefore autonomous. Furthermore, due to its symmetrical structure, using the valid signals available at the output of the first stage 100, it is freed from all signatures.

One of the specific features of the circuit illustrated in FIG. 1 is that when at least one of the items of data is in the invalid state, the state of each of the nodes of the circuit may be determined simply from the current state of the input bits of the circuit. This permits any memory effects of previous calculations to be deleted, which could be induced by states inside the gate (high impedance).

Another specific feature of such a circuit is the symmetry of its structure. Regardless of the input data of the gate, its structure permits it to group together the different nodes of the gate, so that, for each of the groups, on the one hand, the total Hamming weight is independent of the value of the a and b inputs and, on the other hand, the equivalent charge of each of the nodes of a same set (seen from the point of view of the input or the output) is identical. The result is that the consumption does not depend on the value of the data at a given time. Furthermore, as the structure of the means of type 110 and 400 and the means of type 310 and 230 permit all of the nodes of the system to be placed in a known state (always the same) as soon as they pass to the invalid state, there is furthermore no parasite memory effect in the gate. In fact there are no nodes (even inside a sub-circuit) in the high impedance state when passing to the buffer state.

There is a double advantage with the switches 220: on the one hand, these switches permit a selection to be made like with a multiplexer of the correct output of the gate from the four possible outputs (only one of the signals 112a, 112b, 112c and 112d adopts the value '1' at any one time) and, on the other hand, it permits the system capacities to be isolated. All of the capacities on one side of an open switch are invisible from the other side, which permits the capacities to be balanced.

The circuit illustrated in FIG. 1 may be the subject of different variants of embodiments. By way of example, the discharge means 310 positioned in the output stage 300, which are common to the outputs 205a, 205b of four chains 210, 250, may be duplicated at the output of each of these chains.

Now in relation to FIG. 5, another variant of an embodiment of the invention will be described, designed to create a NAND logic function.

Figure 5:
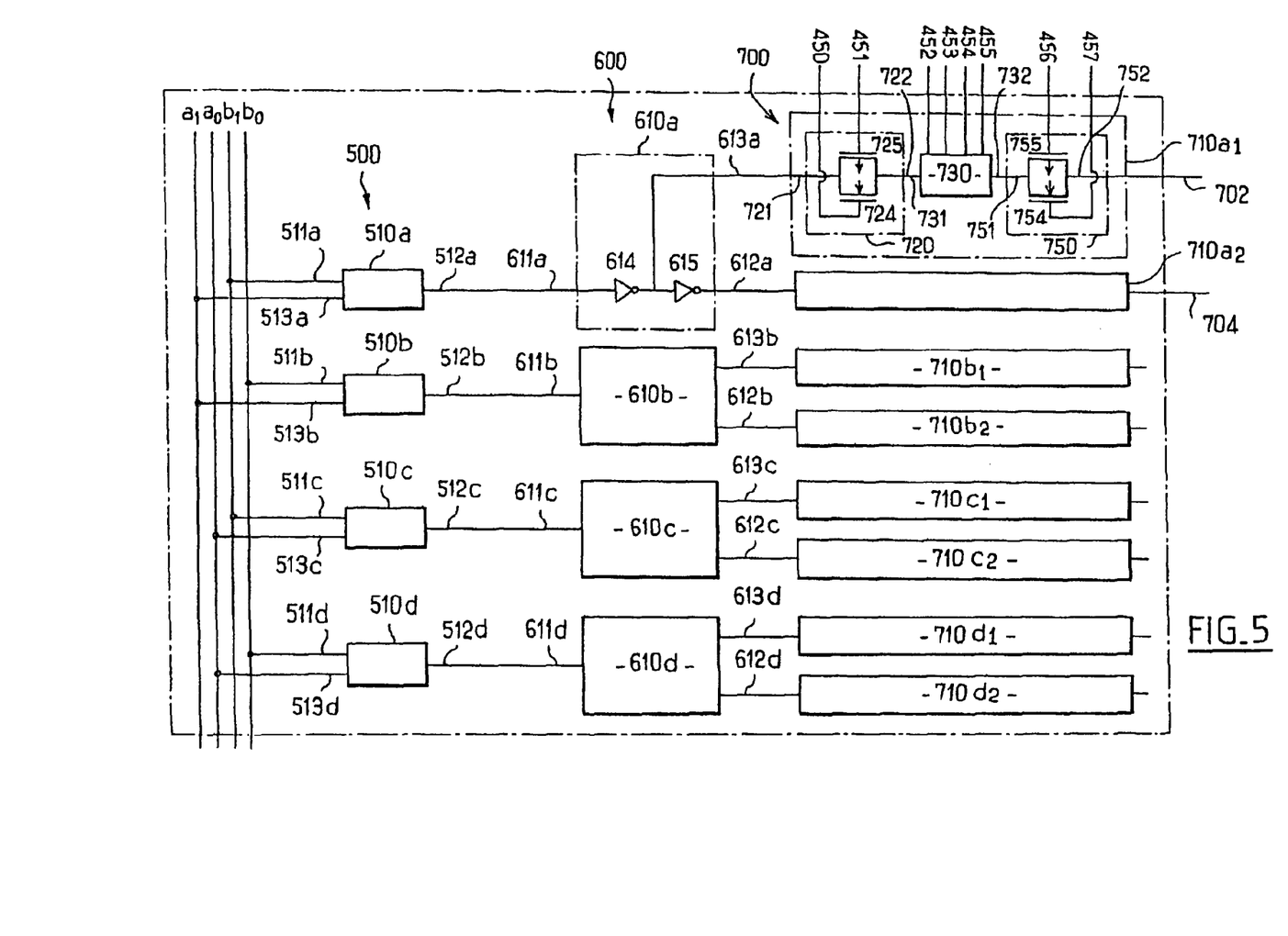
FIG. 5 is a block diagram of a logic circuit of another possible embodiment of the invention creating a NAND logic function in mode synchronous.

FIG. 5 illustrates an example of one possible embodiment of the invention in the case of it creating a NAND logic function used as part of a synchronous protocol. The gate carries out a binary NAND operation between two logic inputs a and b. Shown below is the truth table of such a NAND gate:

| a | b | NAND(a, b) |
|---|---|---|
| false | false | true |
| true | false | true |
| false | true | true |
| true | true | false |

The inputs a and b are coded on 2 bits. Consequently the input a is represented by two bits a1 and a0 and the input b by two bits b1 and b0. When a is equal to '1', a1='1' and a0='0'. If a is equal to '0', a1 is equal to '0' and a0 is equal to '1'. The state a1='1' and a0='1' codes a given invalid state still called buffer state. The protocol makes it possible to impose that the processing of all valid data is followed by the processing of the buffer state, the purpose of which is to reset all of the nodes inside the system, which deletes any memory effect in the gate considered. The state a1='0' and a0='0' is not used.

Apart from these a and b inputs coded on two bits, the gate requires several protocol signals, in this case 8, references 450 to 457. These signals 450 to 457 are generated deterministically and independently from the data, outside of the gate, by any circuitry (for example a state machine) that is outside of the perimeter of the invention. These protocol signals are coded classically with a single bit.

The truth table of the NAND gate thus becomes:

| a | b | a1 | a0 | b1 | b0 | NAND (a, b) | NAND (a, b)1 | NAND (a, b)0 |
|---|---|----|----|----|----|-------------|--------------|--------------|
| invalid | invalid | 1 | 1 | 1 | 1 | invalid | 1 | 1 |
| false | false | 0 | 1 | 0 | 1 | true | 1 | 0 |
| true | false | 1 | 0 | 0 | 1 | true | 1 | 0 |
| false | true | 0 | 1 | 1 | 0 | true | 1 | 0 |
| true | true | 1 | 0 | 1 | 0 | false | 0 | 1 |

It should be noted that the other combinations are forbidden by the protocol and the design of the circuit which comprises this gate. The calculation must only be made between two valid data items or between two buffer states. This purely physical problem of synthesis and routing position is a classic problem in the design of integrated circuits.

The circuit shown in FIG. 5 comprises an input stage 500, a coding stage 600 and a switch stage 700.

The input stage 500 comprises 4 (Z) circuits 510 with two inputs 511, 513, respectively connected to different pairs of input data a1, a0, b1 and b0 and one output 512. The circuits 510 create a classic bit to bit NAND function between their two inputs 511, 513. The output of the device 510a (signal 512a) always corresponds to the NAND calculation value (a1, b1), and therefore NAND(a, b) in classic coding.

Figure 6:
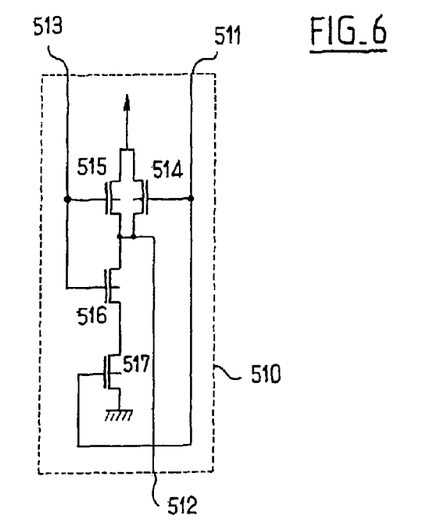
FIGS. 6 and 7 detail the structure of possible sub-assemblies of the embodiment presented in FIG. 5.

One example of an embodiment of a circuit 510 is illustrated in FIG. 6. Such a circuit comprises four transistors 514, 515, 516 and 517. The two MOS transistors 514 and 515 of type p have their drain-source conduction paths connected in parallel between the positive power supply terminal and a node which corresponds to the output 512 of the circuit 510. Their grills are respectively solicited by an input signal a1, a0, b1 and b0, via an input 511 or 513. The two other transistors 516 and 517 of type n have their drain-source conduction path connected in series between the node 512 and the earth. Their grills are respectively solicited by the inputs 513 and 511.

The stage 600 which follows the input stage 500, comprises 4 (Z) circuits 610 with one input 611 and two outputs 612, 613. The circuits 610 are respectively connected, at their input, to the outputs of a circuit 510. They carry out a coding function. These circuits are simply formed by two inverters 614, 615. They respectively calculate the values planned by the protocol for each of the bits in the case of a valid item of data. By way of example, the signals 612a and 613a available on the outputs of the circuits 610a respectively correspond to NAND(a,b)1 and NAND(a,b)0 in the case where the data items a and b are both valid, which is to say that they are neither one in a buffer state.

More precisely the circuits 610 comprise the two inverters 614, 615 in series between the input 611 and a first output 612, wherein the second output 613 is taken on the intermediate point common to the two inverters 614, 615.

The switch type circuits 700 carry out the crucial operation that is the impedance adaptation. In fact, for such a logic gate, it is necessary for the capacities seen by each of the nodes 612a, 613a, 612b, 613b, 612c, 613c, 612d, 613d to be identical.

The switch stage 700 comprises 2.Z, which is to say in this case 8, switch modules 710, respectively connected to the outputs of the coding circuits 610.

The switch circuits 710 feature in particular devices acting as switches designed to isolate certain capacities of the system. They further comprise elements which permit the protocol to be respected and to force the different nodes of the circuit into a known state in the event of a calculation on the buffer state.

To this end, each circuit 710 comprises in the embodiment shown in FIG. 5, an intermediate stage creating a multiplexing function 730 inter-positioned between two switches 720, 750.

The device 730 is a multiplexer permitting the choice to be made between the data item that is transmitted by the upstream switch 720 and the value '1' corresponding to the sending of the buffer state to a possible next gate. This device further comprises structures for discharge to the earth permitting it to keep no memory of the calculations made previously.

The switch circuits 720 preferably comprise two switch transistors 724, 725. The two transistors 724 and 725 of opposite types n and p have their drain-source conduction path in parallel between the input 721 and the output 722. Their grills are respectively solicited by an external timing signal 450, 451. These switches 724, 725 are briefly opened by the signals 450, 453 to sample the result of the calculation as part of the valid data and remain in the closed position for a calculation on the buffer state as the multiplexers 730 then take on the charge to transmit the buffer state to any possible next logic gates.

Figure 7:
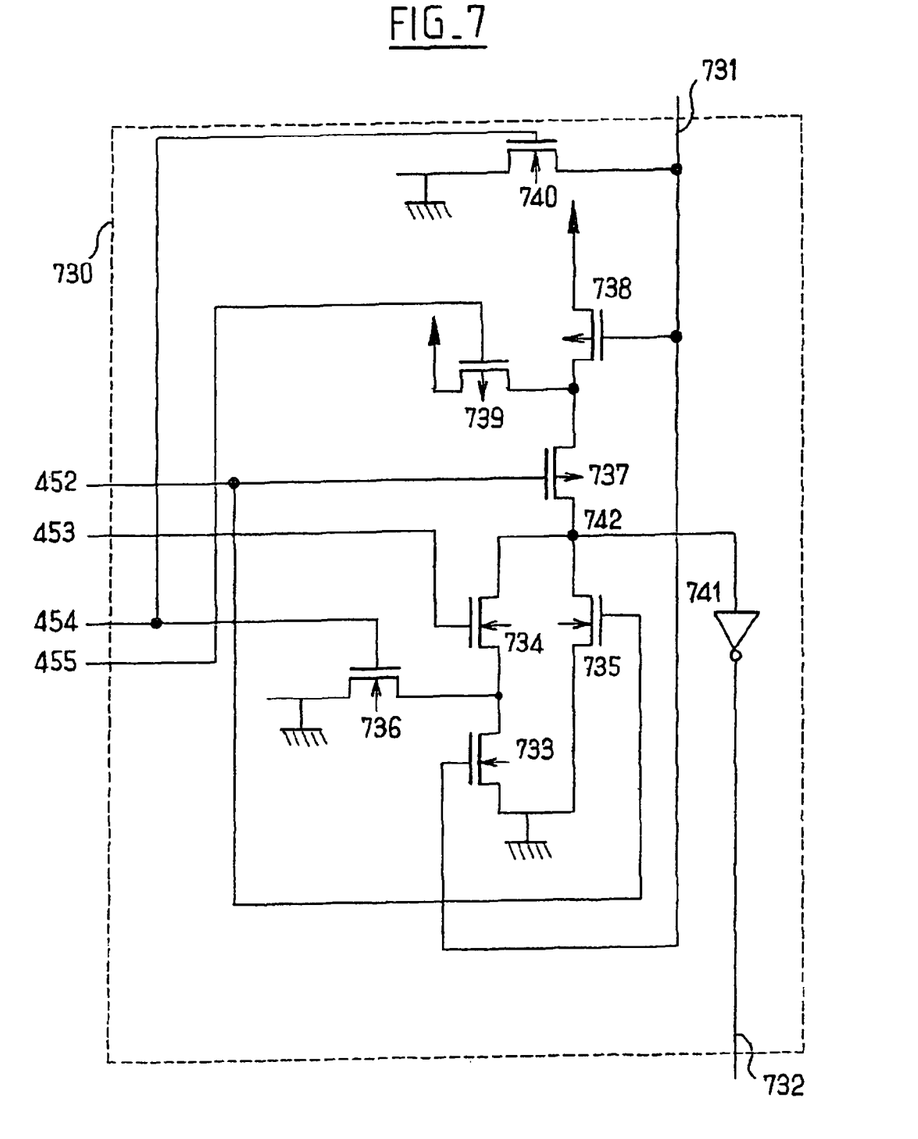

FIG. 7 shows a non restrictive example of one embodiment of a circuit with a multiplexing function 730. This circuit 730 comprises 8 transistors 733 to 740 and an inverter 741. The input 731 is connected to the grill of the T 733 type n whose drain-source conduction path is in series to that of T 734 type n between the earth and an internal node 742. The transistor T 735 type n has its drain source path between the node 742 and the earth. Its grill is solicited by the signal 452. The drain-source path of the T 736 type n is placed between the earth and the point common to T 733 and T 734. Its grill is solicited by the signal 454. The grills of T 734 and T 735 are respectively solicited by the signals 453 and 452. The drain-paths source of the transistors T 737 and T 738 type p are placed in series between the node 742 and the positive power supply terminal. Their grills are respectively solicited by the signal 452 and the input 731. The drain-source path of T 740 type n is placed between the earth and the input 731. Its grill is solicited by the signal 454. Finally the inverter 741 is placed between the node 742 and the output 732.

The downstream switches 750 are structurally identical to the switches 720, but are commanded by a different command (456, 457) permitting the result of the calculation on valid data items and the result of the calculation on buffer data items to pass alternately. The switches 750 comprise two transistors 754 and 755 of opposite types n and p whose drain-source conduction paths are placed in parallel between the input 751 and the output 752. Their grills are respectively solicited by an external timing signal 457, 456.

If applicable, the output switches 750 may be omitted if the circuits 730 acting as the multiplexer have an adequate internal impedance.

If applicable, the switches may be formed not by two transistors of opposite types mounted in parallel to transport respectively high signals and low signals optimally, but by a single transistor permitting the transportation of signals called '0' weak and '1' weak electronic states.

The accessible outputs 702, 704 of the global circuit are taken from the outputs of the circuits 710a1 and 710a2. The outputs of the other circuits 710b1, 710b2, 710c1, 710c2, 710d1 and 710d2 remain inaccessible inside the circuit.

The output 702 corresponds to the NAND(a,b)0 logic function, whereas the output 704 corresponds to the NAND(a,b)1 logic function.

Such a device very schematically acts as a lock. It permits the calculations made in one part of the circuit to be masked with respect to the rest of the circuit. Everything that is in one side of an open switch is invisible from the point of view of the devices placed on the other side.

The presence of a device 710 downstream of each of the outputs of the circuits 610 permits an impedance adaptation to be made such that the capacities are balanced at all times in the protocol, regardless of the charge on the outputs 702 and 704 of the device, even in the case where the charges are infinite on the outputs of the circuits 710b1, 710b2, 710c1 710c2, 710d1 and 710d2 (possibly not connected).

In fact, if any charge is connected to the outputs 612a and 612b without connecting the 6 other outputs 612 and 613 of the device, there would result a capacitive dissymmetry which would be reflected very strongly in terms of signature. A logic gate based on the diagram illustrated in FIG. 5, but that would not include the devices 710 would not provide satisfaction in terms of protection.

It should be noted that at each moment, the Hamming weight of the intermediate data items already established is independent of the a and b data items that are processed. This is necessary, but in no way adequate. In the case of a calculation on the buffer state, the state of all the nodes of the circuit must be known and adapted by the mechanisms forming a switch.

Figure 8:
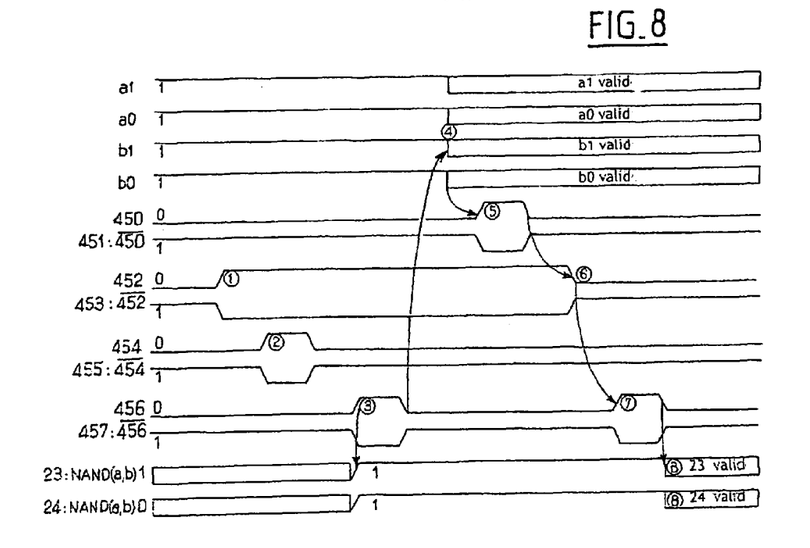
FIG. 8 is un descriptive chronogram of a protocol that may be used to pilot the creation of the invention presented in FIG. 5.

The complete protocol which corresponds to a calculation on any two data items is presented in FIG. 8. Only the order of transition of the commands is important. The difference between the various transitions must however be sufficient to leave enough time for the circuit to reach a stable state before receiving a new command.

Figure 9:
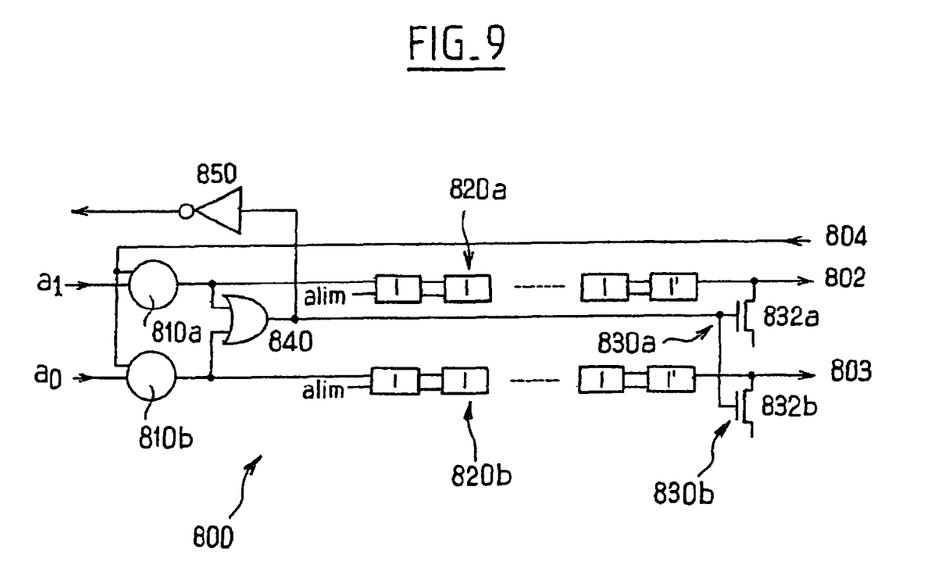
FIG. 9 shows another variant of an embodiment of the invention designed to use a toggle type logic function providing a memory function.

FIG. 9 illustrates an example of an embodiment of a toggle 800 of the invention. This circuit 800 is designed to operate in 4 phase double rail asynchronous protocol. It uses two bits a1 and a0 such that for a=0, a1=0 et a1=1, whereas for a=1, a1=1 and a0=0. The circuit 800 features two input circuits 810a and 810b with similar structures to the circuits 110 previously mentioned. These circuits 810 receive on their two inputs on the one hand a respective signal a1 and a0, and on the other hand an acceptance signal 804. The outputs of the circuits 810 are connected to the respective inputs of two chains of switches 820a and 820b with similar structures to the circuits 210 previously mentioned. The outputs of these two chains 820a and 820b provide the outputs 802 and 803 of the assembly. These outputs are charged by the discharge cells 830a, 830b similar to the circuits 230, comprising a transistor 832 whose grill is solicited by the output of a gate 840 carrying out the logic function or from the output of the circuits 810. Finally, an inverter 850 whose input is connected to the output of the gate 840, generates at its output, an acceptance signal.

The gates of the invention previously described may advantageously be combined to form any logic function. However, the protocol signals of each gate must be coordinated with the inputs of the gate, Furthermore, the positioning-routing and the manufacturing process of all the components of the circuit must be adapted so that, with all pairs of components with analogous functions, these components have the same electrical behaviour, in terms of current, voltage, time and phase, to avoid any signatures.

Of course, this invention is not restricted to the specific embodiments that have been described, but may be extended to any variants in accordance with its nature.

In particular, a circuit may be created which uses the OR logic function from a structure to that illustrated in FIG. 1, simply by inverting the connections of the inputs 213b, 213c and 253b, 253c, which is to say by connecting the inputs 213b and 213c not to the earth, but to the positive power supply and by connecting the inputs 253b and 253c not to the positive power supply, but to the earth.

Similarly, a circuit may be created which uses the XOR logic function from a structure to that illustrated in FIG. 1, simply by connecting the inputs 213a, 253d, 253b and 253c to the positive power supply and the input 213b, 213c, 253a and 213d to the earth.

This invention leads to a logic gate whose consumption is independent from its input data and its logic state. It may find many applications. By way of a non restrictive example, the protection of chip cards may be mentioned (advantageously compliant with the ISO 7816, 14443 or 15693 standards) and other cryptosystems to combat attacks by auxiliary channels such as attacks by collision and attacks by differential analysis of current, power or consumption.

In other advantageous characteristics of the invention:
the synchronous protocol command signals are partially or totally generated outside the gate.
the device constitutes all or part of a device carrying out a cryptographic operation that uses a secret element.
the device has means 400, 610, permitting two distinct signals that are to be established virtually simultaneously, to be synchronised.
these synchronisation means use inverters 614, 615.
the synchronisation means 400 use OR gates 410.

FIGS. 8 and 9

| valide | valid |
|---|---|
| alim | power supply |

The invention claimed is:

1. Device forming an electrical circuit using a protocol implementing a valid data state and an invalid data state, the device comprising:
   logic means forming switches included in a logic gate, wherein the switches refresh nodes of the logic gate to a predetermined known state as soon as the logic gate passes to the invalid state to de-correlate input data of the logic gate from measurable electrical or electromagnetic behavior of the logic gate, by deleting all memory effects in the logic gate as soon as the logic gate passes to the invalid data state.

2. Device of claim 1, the logic gate carrying out a logic function and wherein the logic gate comprises an input interface to receive quantities on which said logic function is calculated, the device further comprising:
   an interface that receives a power supply;
   a transitory state electronic circuit connected to the input interface which calculates said logic function on said quantities, so that consumption of said circuit during said calculation on said quantities cannot be correlated to said quantities; and an interface output permitting the result of said logic function to be communicated to the environment of said device.

3. Device of claim 1 further comprising:

means capable of carrying out discharging operations on certain of the nodes to earth.

4. Device of claim 1 further comprising:

means capable of carrying out charging operations on certain of the nodes by a power supply.

5. Device of claim 1, wherein two switches of the means forming switches are placed in series and an intermediate node between the two switches is connected to charging or discharging means.

6. Device of claim 1 further comprising:

several groups of the means forming switches and means capable of carrying out the charging or discharging operations, wherein each of the groups comprises several elementary branches connected at one end and interpositioned between several of said means forming switches and said means capable of carrying out the charging or discharging operations, wherein the other end of each of said branches is connected either to a power supply or a reference potential.

7. Device of claim 1, wherein each logic bit (a,b) of the input data processed by the logic function is represented by several physical bits (a1, a0, b1, b0) such that the Hamming weight of said representation is independent of the logic value of said logic bits.

8. Device of claim 1, wherein the device uses a double rail asynchronous protocol.

9. Device of claim 1, wherein the device uses a synchronous protocol.

10. Device of claim 1, wherein the device forms all or part of a second device carrying out a cryptographic operation.

11. Device of claim 1 further comprising:

means to increase propagation time of certain intermediate variables so as to reduce absolute consumption of the gate by limiting dynamic leak currents.

12. Device of claim 1, wherein said means forming switches are each formed by a single MOS transistor.

13. Device of claim 1, wherein said means forming switches are each formed by a NMOS transistor and a PMOS transistor.

14. Device of claim 1, wherein said means forming switches are each formed by several MOS transistors.

15. Device of claim 1 further comprising:

an input stage composed of meeting elements, an intermediate stage composed of chains formed by an alternated association of the means forming switches and charging/discharging devices, an output stage and a module to generate a control command for the intermediate and output stages.

16. Device of claim 1 further comprising:

an input stage composed of 4 meeting elements, an intermediate stage composed of 2 groups of 4 chains formed by alternated association of the means forming switches and charging/discharging devices, an output stage comprising two discharge circuits and a module to generate a control command for the intermediate and output stages.

17. Device of claim 1 further comprising:

an input stage comprising circuits that calculate a logic function, a coding stage comprising circuits that respectively calculate logic values, provided by a protocol, of each logic bit of the input data in the case of a valid data item and a switch stage that carries out an impedance adaptation.

* * * * *